O. M. RICE.
DEMOUNTABLE AUTOMOBILE RIM TOOL.
APPLICATION FILED FEB. 19, 1920.
1,374,031.
Patented Apr. 5, 1921.
2 SHEETS—SHEET 1.
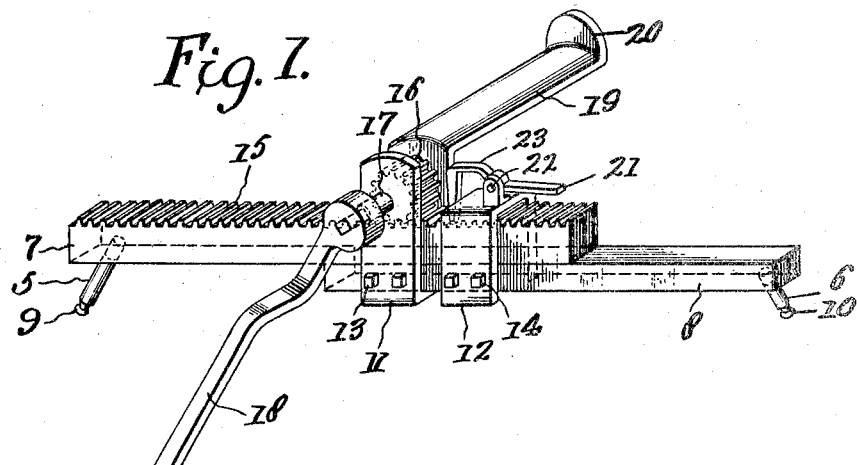
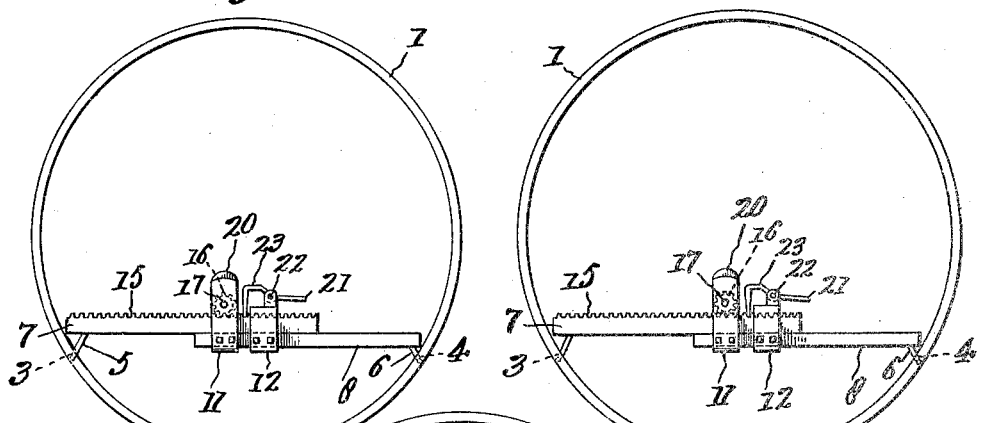

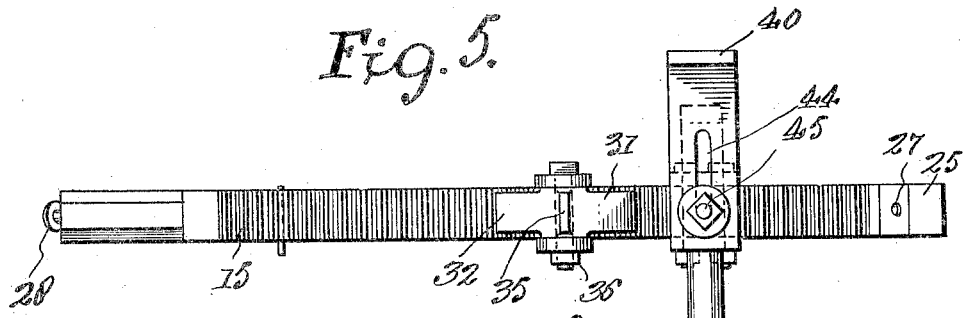
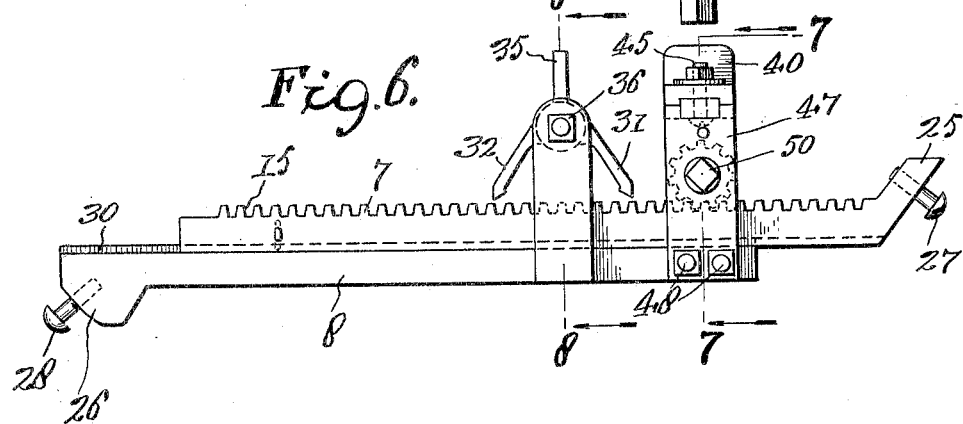
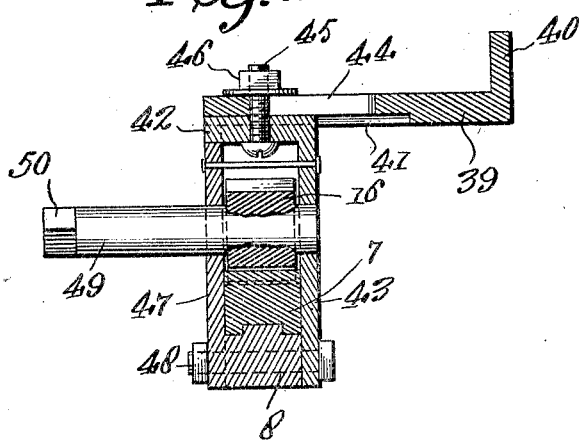
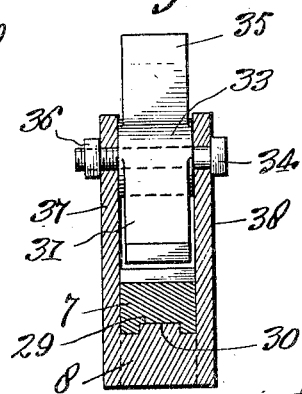

UNITED STATES PATENT OFFICE.

OLIVER M. RICE, OF BIRMINGHAM, ALABAMA.

DEMOUNTABLE-AUTOMOBILE-RIM TOOL.

1,374,031.      Specification of Letters Patent.      Patented Apr. 5, 1921.

Application filed February 19, 1920. Serial No. 360,011.

*To all whom it may concern:*

Be it known that I, OLIVER M. RICE, a citizen of the United States, residing at Birmingham, in the county of Jefferson and State of Alabama, have invented certain new and useful Improvements in Demountable-Automobile-Rim Tools; and I do hereby declare the following to be a full, clear, and exact description of the invention, such as will enable others skilled in the art to which it appertains to make and use the same.

The present invention relates to improvements in demountable automobile rim tools, and has for an object to provide an improved device for contracting and expanding the demountable rims which carry the inner tubes and shoes.

Another object of the present invention resides in providing an improved tool for carrying out the above described purposes in an easy and expeditious manner without the application of very great energy on the part of the operator.

A further object of the present invention lies in providing a device for contracting and expanding demountable automobile tire rims which is simple in construction and may be made up cheaply to fit existing forms of rims, with the exception of boring two holes therein.

In the accompanying drawings forming a part of this application, and in which similar reference symbols indicate corresponding parts in the several views:

Figure 1 is a perspective view of an improved tool constructed in accordance with the present invention.

Fig. 2 is a side elevational view of a rim with the tool applied.

Fig. 3 is a similar view showing the rim slightly expanded.

Fig. 4 is a similar view with the rim contracted.

Fig. 5 is a top plan view of a slightly modified form of the invention.

Fig. 6 is a side elevational view of the same.

Fig. 7 is a cross sectional view taken on the line 7—7 in Fig. 6; and

Fig. 8 is a similar view taken on the line 8—8 also in Fig. 6.

Referring more particularly to Figs. 1–4 of the drawings, 1 designates the usual form of an automobile demountable rim having the cross cut 2, at which the rim may be expanded and contracted when placing or removing the shoe and inner tube.

The rim 1 is drilled with holes at the points 3 and 4 in order to receive the posts 5 and 6, respectively, of the tool, which project from the under sides and near the remote free ends of a pair of slidably connected bars 7 and 8. The posts 5 and 6 are notched near their outer free ends as indicated at 9 and 10, so as to take firm hold in the holes at the points 3 and 4.

The bar 7 slides freely over the upper face of the companion bar 8 so as to move the pins 5 and 6 together or apart accordingly as the bars are moved in the one or the other direction. A pair of U-shaped guides 11 and 12 are bolted or otherwise secured to the bar 8, as indicated at 13 and 14, and have their opposite sides extending up beyond the upper face of said bar 8 for the purpose of confining the bar 7 along opposite sides and guiding it in its reciprocating movement on said bar 8.

The upper face of the bar 7 is formed with teeth 15, and in mesh with such teeth 15 is a pinion or cog wheel 16. The pinion 16 is supported on a shaft 17 journaled in the vertical arms of the clamp or guide 11 in such position that the teeth of the pinion 16 are constantly in mesh with the teeth 15 on the bar 7.

The shaft 17 receives a crank handle 18 by which rotary movement may be imparted in either direction to the pinion 16. The vertical arm of the guide or clamp 11 on the side opposite to the crank 18 is extended and bent over at substantially right angles to provide a foot 19 having an oppositely bent toe 20 adapted to engage the ground or the supporting surface, and to hold the rim and tire at an elevation thereabove so as not to interfere with the free operation of the parts.

The clamp or guide 12 is provided with a lever or handle 21 fulcrumed as indicated at 22 and connected to a pawl 23 adapted to engage in the teeth 15 to prevent collapse of the bars 7 and 8 while the rim is expanded and the hand removed from the crank 18.

In use the device is applied as shown in Fig. 2, with the pins 5 and 6 engaged in the holes of the rim 1 provided at the points 3 and 4. One hand is employed to depress the lever 21 whereby to lift the pawl 23 out of engagement with the teeth 15, while the other hand is used to rotate the crank 18 in the desired direction.

As shown in Fig. 3, the crank has been rotated in a clockwise direction, causing the pinion 16 to advance the bar 7 to the left, thus causing the expansion of the rim 1 at the point 2.

As indicated in Fig. 4, the crank handle 18 has been rotated in a counter-clockwise direction to draw the two bars 7 and 8 together and cause the collapse of the rim. A suitable tool is used to pry the free ends of the rim at the cross cut 2 out of alinement, so that they may overlap and collapse as illustrated in Fig. 4.

At any point desired the pawl 22 may be allowed to engage in the teeth 15, and the same will act to hold the parts in the desired position.

Referring now more particularly to Figs. 5 to 8 inclusive, the device herein shown resembles that previously described in most parts, but is modified in several respects which will presently appear. Similar reference numerals have been placed on similar parts, and a further description of the same is not thought necessary.

The bars 7 and 8 in this form, are provided with angularly disposed ends 25 and 26, respectively, for holding the pins 27 and 28 at the requisite angle to allow the pins to enter the holes in the tire rim with facility but at the same time permit of attaching the pins at right angles to the supporting ends 25 and 26, which enables them to be held therein in a much stronger manner.

The bar 7 is provided with a longitudinal groove in its lower face to receive the longitudinally extending rib 30 projecting above the upper face of the lower bar 8. This groove and rib provide for guiding the two bars 7 and 8 in their sliding movement on one another, and prevent the same from accidentally getting out of alinement.

In this form of the invention the pawl is also made slightly different, consisting of two pallets 31 and 32 projecting diagonally downward in opposite directions and adapted to alternately engage the teeth 15 on the rack bar 7. The inclination given the lower pallets 31 is in opposite directions so that the pallet 31 may freely allow the bar 7 to be moved in a right hand direction, speaking with reference to Fig. 6, but will effectually prevent movement to the left; while the companion pallet 32 serves to prevent movement of the bar 7 to the right, allowing its free movement in the opposite direction.

The pallets extend from a barrel 33 mounted for oscillating movement on a pin 34 journaled in the pawl guide or bracket, and the barrel 33 is provided with an operating piece 35 by which the pallets 31 and 32 may be selectively engaged with the rack 15.

If desired, the pin 34 may be threaded to receive a nut 36 by which the uprights 37 and 38 of the pawl guide may be clamped tightly against the ends of the barrel 33 to cause a frictional binding between these parts, whereby either of the pallets may be held by engagement with the rack 15 when so placed.

In this form of the invention also the foot 39 is slightly modified in that it is made in a separate piece together with its toe 40, and is formed with a longitudinally extending recess 41 adapted to fit a raised rib 42 in the upper end of a guide 43. The foot 39 is also slotted as indicated at 44 to admit of adjustability, and a screw 45 is adapted to pass through the slot 44 and through the guide, a nut 46 being employed to hold the foot in the adjusted position.

The guide 43 is made of an inverted L-shape, as shown in Fig. 7, and is completed by a plate or upright 47 fitted up against the opposite sides of the bars 7 and 8 and secured as by a bolt 48 to the lower bar 8.

In this form of the invention the shaft 49 which carries the pinion 16 is elongated over that shown in the first form of the invention, and is formed with a straight line portion 50 to receive a crank handle which may be straight and not necessarily bent in the manner shown in Fig. 1.

The use of this device is substantially the same as referred to in connection with the first form of the invention shown in Figs. 1 to 4 inclusive, but in actual use this latter described form has been found to be freer from binding and is of a more flexible character, adapted to fit different types of rims, and is readily adjustable to meet different uses.

It is obvious that those skilled in the art may vary the details of construction and arrangements of parts without departing from the spirit of my invention, and therefore I do not wish to be limited to such features except as may be required by the claims.

I claim:

1. A tool of the character described comprising a pair of companion bars slidable one upon the other and having pins projecting at acute angles to the longitudinal axes of the bars to engage openings made in a demountable rim at opposite sides of its cross cut, means carried by one bar and operating in conjunction with the companion bar whereby to slide said bars relatively, operating means for said last named means, supporting means for said bar sliding means, a supporting foot having an angularly disposed toe extending from said supporting means, and means supported by one bar and engaging the other bar for holding said bars in any position of adjustment, substantially as described.

2. A tool of the character described comprising a pair of bars, the under bar provided with a rib running longitudinally on its upper surface, the upper bar provided with a groove receiving said rib, said under bar provided with an enlarged head at one end, said head projecting downwardly and having a diagonal outer lower face, a pin projecting at right angles from the diagonal lower face of said head and adapted to engage in an opening made in a demountable rim, the outer end of the upper bar being turned upwardly and having a substantially diagonal outer face, a pin in said end extending at right angles to said diagonal face and adapted to enter a second opening made in the demountable rim, a guide secured at its lower ends to the lower bar near one end thereof and extending upwardly whereby to embrace the sides of the upper bar, the upper end of said guide being provided with a rib, a foot comprising a groove slidable on said rib at right angles to the direction of movement of said bars, means to hold said foot in any position of adjustment, means held by said guide for moving the bars relatively, and means carried by one bar and coöperating with the other bar to secure the bars against movement, substantially as described.

3. A tool of the character described comprising a pair of relatively movable bars, the lower bar provided with a raised rib on its upper face and extending in a longitudinal direction, the upper bar provided with a groove on its lower face slidably fitting said rib, a guide composed of a pair of spaced apart plates secured at their lower ends to the lower bar near one end thereof and extending up embracing the sides of the upper bar, a pinion supported in said guide plates above the upper bar, rack teeth formed on the upper surface of the upper bar engaged by said pinion, an extended shaft journaled in said guide bars and arranged to turn said pinion, the upper end of said guide provided with a rib extending transversely with respect to the path of movement of the bars, a foot provided with a groove slidable on said rib and having an angularly disposed toe, means engaging said foot and guide for holding the foot in any position of adjustment, a support held by the lower bar at one side of said guide and extending upwardly beyond the upper bar, a pair of pawls extending in opposite directions and mounted in said support, said pawls adapted to alternately engage the rack teeth on said upper bar, an operating part having connection with said pawls for swinging the same in either direction, and parts on said bars for engaging a demountable rim, substantially as described.

OLIVER M. RICE.